July 11, 1950 — O. DANIELS — 2,514,747

FLUID PRESSURE OPERATED APPARATUS

Filed Jan. 15, 1945 — 2 Sheets-Sheet 1

Inventor
Oscar Daniels,
By McMorrow & Berman
Attorneys

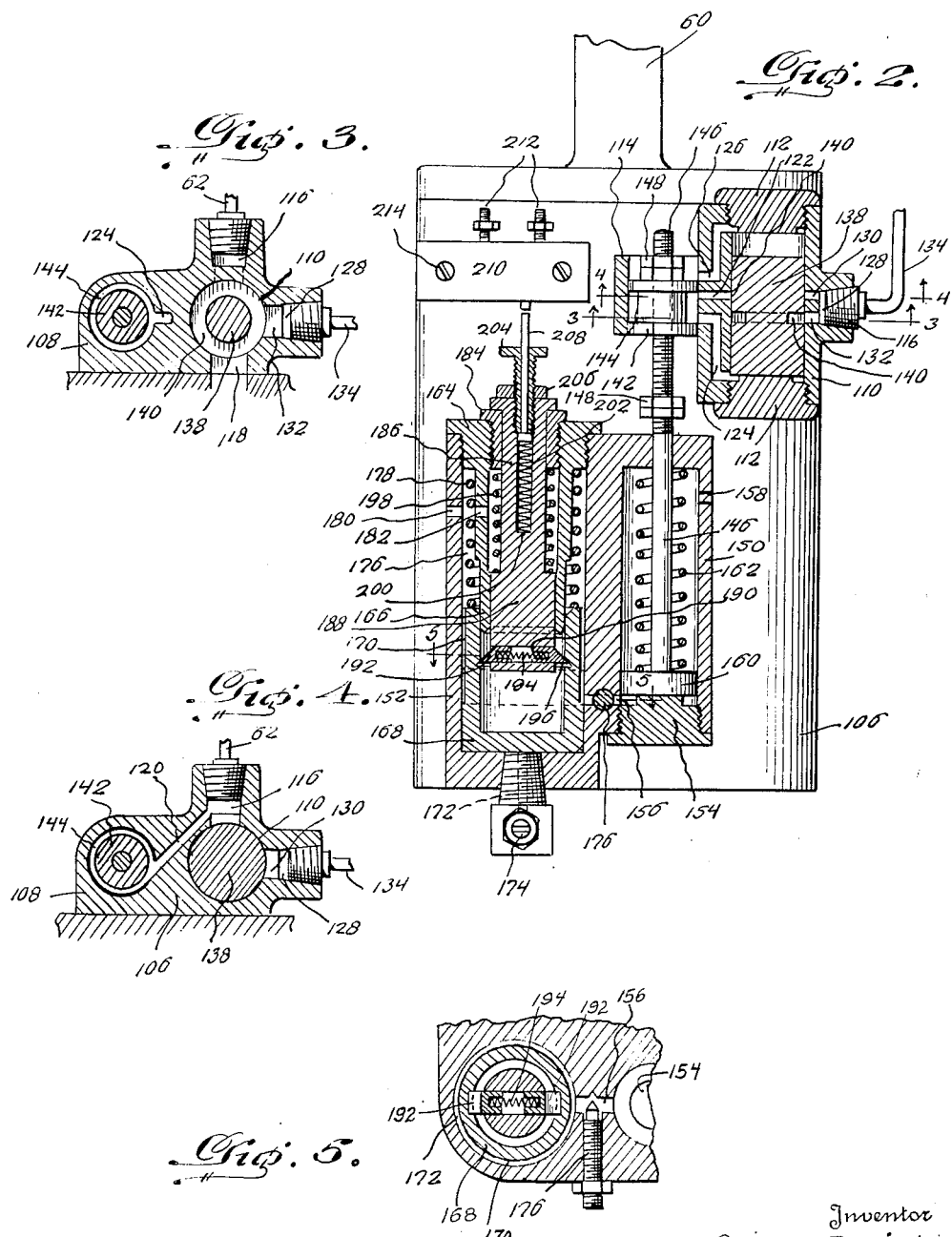

Patented July 11, 1950

2,514,747

UNITED STATES PATENT OFFICE 2,514,747

FLUID PRESSURE OPERATED APPARATUS

Oscar Daniels, Oshawa, Ontario, Canada

Application January 15, 1945, Serial No. 572,887

6 Claims. (Cl. 121—38)

This invention appertains to improvements in fluid pressure operated apparatus which may be applied to various uses, particularly for measuring the duration of current flow in an electrical circuit, e. g., the current flow or impulse employed to control the operation of a pneumatic spot welding tool or machine.

An object of the invention is to provide an improved apparatus of this kind to effect the control of an electrical contactor or switch which is caused to initiate the welding current impulse and after a predetermined time interval to break the current flow, the operation of the contactor being co-related with the movements or position of the electrodes of the welding tool or machine so that the latter remain engaged with the work during current flow and for a measured time interval after the current is cut off.

Another object of the invention lies in the provision of a mechanically refined valve, of the non-beat type, for controlling the fluid pressure from a single main supply line to a timing device designed to insure of accurate and efficient operation of the welding tool or machine, the valve preferably taking the form of a handle in assembly with the timing device for convenience in manipulation by the operator of the tool or machine.

A further object of the invention has to do with the provision of an automatic timer unit, which is comparatively inexpensive to manufacture, compactly constructed with a minimum of parts, foolproof in design, and highly accurate and efficient in operation.

Yet another object of the invention is to provide a control valve and timer combination as hereinbefore characterized, which, by operating with but a single fluid pressure supply line, effects an appreciable saving in construction material and operation costs, requiring less hose or pipes and the couplings therefor, as well as a less volume of fluid pressure.

With these and other objects and advantages in view, the invention resides in the certain new and useful combination, construction, and arrangement of parts, as will be hereinafter more fully described, set forth in the appended claims, and illustrated in the accompanying drawings, in which:

Figure 2 is a vertical section, taken through the line 2—2 on Figure 1, looking in the direction of the arrows;

Figure 3 is a horizontal sectional detail, taken through the line 3—3 on Figure 2, looking in the direction of the arrows;

Figure 4 is a sectional detail similar to that of Figure 3, but taken through the line 4—4 on Figure 2, looking in the direction of the arrows; and Figure 5 is still another sectional detail, taken through the line 5—5 on Figure 2, looking in the direction of the arrows.

Figure 1:
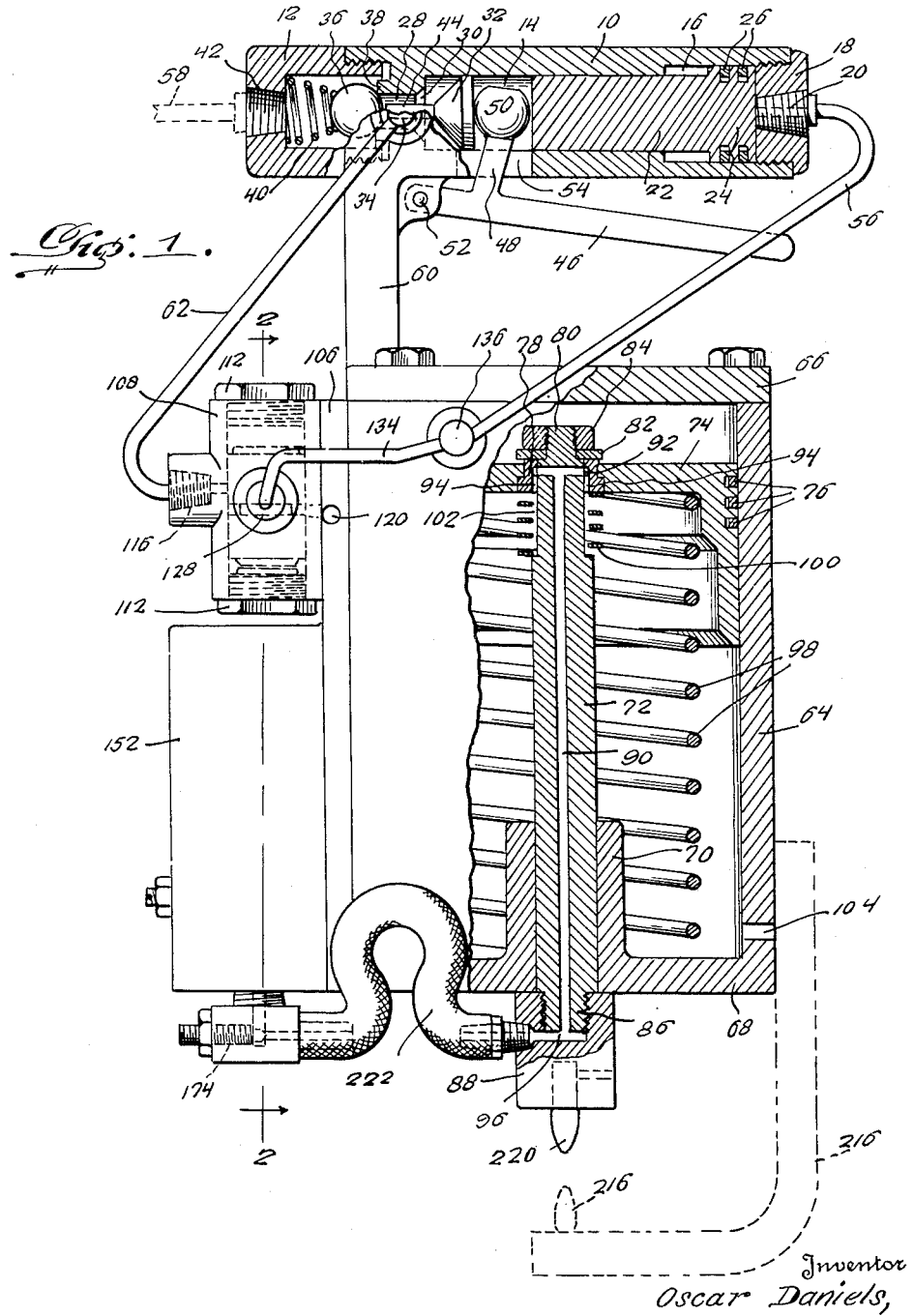
Figure 1 is a side elevation, partly in section, of a pneumatic spot welding unit, in accordance with the invention.

Referring to the drawings, wherein like characters of reference denote corresponding parts in the several views, the invention, as it is exemplified therein, is comprised essentially in a manually actuated control valve and a timing device for measuring the duration of the welding current impulse, the same being described herein in connection with a pneumatic spot welding tool or machine, although they are adapted for other uses, for instance, with reciprocating steam engines and pumps and with certain hydraulically operated tools and machines.

As shown in Figure 1, the control valve (hereinafter called the controller) and the timing device are preferably arranged in unit assembly, the controller taking the form of a handle for the manipulation of the unit during welding operations. The controller is comprised in an elongated cylindrical casting part 10, having a bore 14 extending centrally inward from one end for nearly the entire length thereof to receive a piston 22. The outer end of the bore 14 is enlarged by a counter-bore 16 to receive a head 24, formed on the outer end of the piston 22, the head being provided with ring packings 26. The outer end of the counterbore or cylinder 16 is closed by a removable screw plug 18, which is provided with a central port 20 for the attachment thereto of an air line 56. The inner end of the bore 14 is communicated by a horizontally slotted passage 28, formed in the end wall of the casting part 10, said wall being provided with a conical seat 30, about the passage 28, to be engaged by a conical valve element 32, which is movable in the bore 14. A port 34 opens laterally from the casting part 10, through the bottom wall of the passage 28, and this is normally closed against the egress of the fluid pressure therethrough, as will presently be explained.

Screw threaded on the latter end of the casting part 10, is a shorter casting part 12, which has a bore opening centrally through its attached end to house a main control valve 36, preferably of ball form, that is normally held closed against an annular seat 38, formed on the connected end of the casting part 10, about the passage 28, by a coiled spring 40. The outer end of the casting part 12 is provided with an inlet port 42, for the connection thereto of a main fluid pressure, e. g., compressed air, supply line 58, this pressure cooperating with the coiled spring 40 in holding the ball valve 36 closed. Projecting into the passage 28, from the conical valve 32, is a plunger 44, which acts to push the ball valve 36 from its seat 38, whenever the conical valve 32 is moved into engagement with its seat 30. With the opening of the ball valve 36 and the closing of the conical valve 32, fluid pressure from the main supply line 58 enters the passage 28 and passes outward through the outlet port 34, from which the fluid pressure is cut off when the ball valve is closed.

With the controller in this inactive state, it is to be rendered active by means of a trigger 46, which preferably takes the form of a hand lever having one end pivoted, as at 52, to the under side of the casting part 10, and an angled arm 48 projecting into the bore 14, through a slotway 54; the arm 48 having a substantially spherical enlargement 50, at its free end, interposed between the piston 22 and the conical valve 32. With the trigger 46 normally disposed, the conical valve 32 is disengaged from its seat 30 and the ball valve 36 is closed on its seat 38, and, when the trigger is actuated to reverse the positions of these valves, it is held, together with the valves, against return to normal positions by a pressure exerted on the piston 22 from the fluid pressure line 56 for a predetermined period of time, i. e., until a welding cycle is completed, as will be later explained.

The timing device, to which the hand controller just described is bracketed, as at 60, for use in the performance of the welding operations, is comprised of a comparatively large main pressure cylinder 64, which is closed at its upper end by a removable cover plate 66 and at its lower end by an integral wall 68, the latter being provided with a centrally disposed and inwardly extending nipple 70, constituting a bearing for a piston rod 72. A piston head 74, having packing rings 76, is cooperatively associated with the inner end of the rod 72 and is provided with a centrally located bushing 78, which seats over the piston end, the head being supported on a flange at the inner or lower end of the bushing and is secured in place by means of a washer 82 and a nut 84, engaged on a reduced part 80, at the top end of the bushing. The outer end of the piston rod 72 is formed with a reduced extension 86, for the screw threading of a cap nut 88 on the same. A passage 90 extends axially through the piston rod 72 and connects a cross duct 92 adjacent the inner end of the rod and with a like duct 96 adjacent the outer end thereof; the cross duct 92 opening into an annular channel 94, formed in the inner side of the bushing 78, and the cross duct 96 into the interior of the cap nut 86. Encircling the piston rod 72, between the head 74 and the end wall 68, of the cylinder, is a coiled spring 98, while a second coiled spring 100 is encircled about a reduced part 102, formed at the inner end of the rod, one end of the latter spring bearing against the inner end of the bushing 78 and the other end against the shoulder at the inner end of the reduced part. An exhaust port 104 opens through the wall of the cylinder 64, immediately inward from the end wall 68.

Mounted on the outer side of the main cylinder 64, is a panel 106, on which a valve block 108 is supported, said block being formed to provide a main valve cylinder 110 and a smaller auxiliary or control valve cylinder 114, offset centrally of and at one side of the main valve cylinder. Both valve cylinders 110 and 114 are open ended, with the open ends of the main valve cylinder 110 closed by cap plugs 112. The valve cylinder 110 is provided with a pair of oppositely disposed main side ports 116 and 118; an inlet port 116, connected by a conduit 62 to the outlet port 24 of the hand controller, and an exhaust port 118 in direct connection with which a passage 120, formed in the panel 106 and open to atmosphere; the latter port being located out of line, i. e., in a plane below the port 116. The inlet port 116 is connected with the interior of the valve cylinder 114 by a duct or passage 122, which opens into the cylinder 114 between the intake ends of a pair of ducts or passages 124 and 126 that open into the valve cylinder 110, at points adjacent the cap plugs 112; these several ducts or passages being formed in the connecting wall of the two valve cylinders. The valve cylinder 110 is provided with a third main side port 128, located midway between the main ports 116 and 118 and opposite the valve cylinder 114, and this port is connected by a pair of parallel ducts or passages 130 and 132 with the interior of the valve cylinder 110, the duct or passage 130 being disposed in the plane of the pressure inlet duct or passage 122, connecting the interior of the valve cylinder 114 with the main inlet port 116, while the duct or passage 132, constituting an exhaust connection with the main exhaust port 118, as will be presently explained. The port 128 is connected by a conduit 134 to a distributing head 136, mounted on the main cylinder 64, with which it communicates at a point above the working piston 74, and also, through the pressure conduit 56, with the interior of the cylinder 16, of the hand controller; the latter conduit having connection with the port 26, in the cap plug 18.

Housed within the main valve cylinder 110, is a plunger 138, that is provided with an annular channel 140 in the plane of its transverse center, which, during the reversed directional motions of the plunger, establishes communication between the main inlet port 116, by way of the duct or passage 122 and the valve cylinder 114, and the outlet port 130, of the third main port 128, on the one hand, and between the exhaust ports 118 and 132, on the other hand. Housed within the auxiliary valve cylinder 114, is a piston type of control valve 142, which is circumferentially channeled, as at 144, to alternately establish communication between the ducts or passages 124 and 126 and the inlet duct or passage 122, leading from the main pressure inlet port 116, to cause the required directional movements of the plunger 138, within the main valve cylinder 110. This piston valve 142 is adjustably mounted on the outer or free end of a piston rod 146, between pairs of oppositely disposed lock nuts 148; the opposite end of the piston rod entering the near end of one of a pair of cylinders 150 and 152, which are preferably cast en bloc substantially as shown in Figure 2. The cylinder 150 has its lower end closed by a cap plug 154 and is provided with a pressure inlet and outlet passage 156, adjacent its lower end, and a side exhaust port 158, open at atmosphere, adjacent its upper end. The inner or lower end of the piston rod 146, within the cylinder 150, carries a head 160 and a coiled spring 162, the latter acting to sustain the piston assembly, including the valve member 142, at their normal lowermost positions, in which position of the latter, its channel 144 establishes communication between the main pressure intake port 116 and the outlet duct or passage 124, by way of the duct or passage 122, so that the plunger 138 is caused to move upward, or to the right, as the case may be, within the cylinder 118, to establish communication between the main pressure intake port 116 and the outlet duct or passage 130 of the main third port 128, by way of the channel 140 in the plunger.

The automatic mechanism proper, for timing or measuring the duration of the welding current impulse, is housed within the cylinder 152, which has its upper open end closed by a cap plug 164, that is provided with a cylindrical sleeve 166, depending therefrom and telescoped within the upper open end of the skirt of an inverted hollow piston 168, the lower end of the sleeve being inwardly bevelled, for purposes which will presently appear. This piston 168, when disposed in its lowermost position, rests on the bottom end wall of the cylinder, closing over a pressure inlet port 172, which is adjustable by means of a needle valve 174. The skirt of the piston 168 is circumferentially reduced to provide an annular passage 170 about the same, to establish communication between the interiors of the cylinders 152 and 150, through the passage 156, which opens through the connecting wall of said cylinders, and, when the piston 168 is at its lowermost position, air from beneath the piston 168 bleeds therethrough into the cylinder 152, from which it subsequently exhausts to atmosphere.

Housed within the annular space 176, between the side wall of the cylinder 152 and the sleeve 166, is a coiled spring 178, and an exhaust port 180 opens to atmosphere through the cylinder wall from this space and from the interior of the sleeve through a like port 182. The exhaust air from the cylinder 150, entering the cylinder 152 through the duct or passage 156, passes to the exhaust port 180, by way of the annular passage 170 and the space 176. The sleeve 166 opens through the cap plug 164 and carries a split nut 184, to reduce the area of the opening therethrough and to receive the reduced part or stem 186, of a piston 188, which is slidable in the lower end of the sleeve. Carried in a cross bore 190, in the piston 188, is a pair of detents or pawls 192 and an interposed coiled spring 194, which tensions the detents outwardly of the bore ends for engagement in recesses 196, formed in the wall of the piston 168, so that, when the latter moves upwardly in relation to the sleeve 166, the detents, in their engagement with the recesses, transmit the upward motion of the piston 168 to the piston 188, the upward movement of both pistons acting to place the coiled spring 178 and a like spring 198, housed within the space between the sleeve 166 and the stem 186, of the piston 188, under compression. The piston stem 186 is provided with an axial bore 200, which opens through its top end to seat a coiled spring 202 and a bushing 204. The bushing 204 is exteriorly screw threaded to receive an adjusting nut 206 which is tightened up against the underlying flanged end of the stem 186, of the piston 188, the flange of the latter engaging with the like end of the bushing 184, when the piston 188 is at its lowermost position of movement. A headed push rod 208 projects outwardly of the bore 200, through the bushing 204, and connects with the movable contactor (not shown) of a micro-switch 210, which has terminals 212 for electrical connection with a solenoid (not shown) of a kva. transformer (not shown) in a usual manner, causing a flow of current to the welding tips 216 and 220, when the circuit is closed; the tip 216 being bracketed, as it 218, to the lower, or left hand, end of the main pressure cylinder 64, and the tip 220 secured in the end of the cap nut 88, on the lower or outer end of the piston rod 72. The control switch 210 is secured in place on the panel 106, by screws or the like 214. A flexible connection 222, in the form of a length of hose, connects an outlet port in the cap nut 88 with the inlet port 172, to allow for freedom of movement of the piston rod 72, in forcibly presenting the welding tip 220 to the work positioned between it and the welding tip 216, the latter being stationarily supported by the bracket 218 in line with the tip 220. The outlet port in the cap nut 88 opens outwardly from cross duct 96, that is in the form of a groove or channel in the lower end of the piston rod 72.

In the operation of the welding apparatus, as thus constituted, and with compressed air on in the main line conduit 58, the air pressure within the casing part 12 aids the coiled spring 40 in maintaining the ball valve 36 on its seat 38, shutting off the air from the outlet 34 and thereby rendering the apparatus inactive. To activate the apparatus, the trigger 46 is depressed and forces the conical valve 32 onto its seat and, at the same time, the plunger 44, carried by the conical valve 32, strikes against the ball valve 36, pushing it to open position, when air pressure from the main line conduit 58 and the interior of the casing part 12 enters the valve seat 38 and passes to the outlet port 34 and the conduit 62 to the intake port 116, in the cylinder block 108. From the intake port 116, the air passes through the duct or passage 122 into the auxiliary valve cylinder 114 and from thence through the duct or passage 124 and into the cylinder 118, beneath the plunger 138, forcing the latter to the opposite end of the cylinder 118. In this position of the plunger 138, its annular channel 140 connects the intake port 116 with the duct or passage 130 and the third main port 128, from which the air passes through the conduit 134 to the distributing head 136, and the conduit 56, to the port 20, in the cap plug 18, of the hand controller, which forces the piston 22 inwardly of the cylinder 16 and against the part 50, of the trigger 46, thus holding the conical valve 32 closed and the ball valve 36 open. Due to the greater area of the piston head 24, with respect to that of the ball valve 36, the force of the air pressure acting against the piston head 24 is sufficient to overcome the combined force of the air pressure and the coiled spring 40 acting against the ball valve in opposition thereto, so that the parts are held in this state until a welding cycle is completed. With the admission of the air pressure to the cylinder 118, it will also pass into the main cylinder 64, through the distributing head 136, forcing the main piston 74 downward until the welding tips 220 and 216 are closed on the work placed therebetween. The air will build up in pressure within the main cylinder 64 to that amount required to overcome the coiled springs 98 and 100 which are compressed until the cross duct 92, is opened, when the air will pass into the cross duct 92 and downward through the axial duct or passage 90, to the cross duct 96 and the outlet port in the cap nut 83. At this point, the welding tips 216 and 220 are in contact with the work under a proper pressure for effective spot welding. From the outlet port in the cap nut 88, the air passes through the flexible connection 222 to the needle valve 174 and the inlet port 172, where it enters the timing device and forces the piston 168 upwardly within the cylinder 152. With the detents or pawls 192 engaged in the recesses 196, the piston 188 is likewise forced in an upward direction, together with the plunger 208, so that the latter closes the contactor of the microswitch 210. With the closing of the switch 210, a circuit is closed on the solenoid of the transformer, from which current passes to the welding tips 216 and 220. As the plunger or push rod 208 travels upward, the piston 188 compresses the coiled spring 202, holding the switch contacts on closed circuit until the detents or pawls 192 strike the bevel on the lower end of the sleeve 166, which will cause them to disengage from the recesses 196. With the upward movement of the piston 188, air compressed by it within the space housing the coiled spring 198 will pass outwardly of the exhaust ports 182 and 180, respectively of the sleeve 166 and the cylinder 152. With the detents or pawls so disengaged, the push rod 208 is pulled to open the switch 210, by the action of the coiled spring 198 to force the piston 188 downward of the sleeve 166, thus cutting off of the current from the welding tips 216 and 220, the allotted welding time having elapsed. The piston 168, however, still travels upward, following the disengagement of the detents or pawls 192, and until its bottom end is in line with the passage 156, controlled by the needle valve 176, when air from the inlet port 172 passes through the port 156 to the cylinder 150, beneath the piston 160, and forces the latter upwardly until the lower pair of lock nuts 148 strike the piston valve 142, moving it upwards within the cylinder 114 to position to direct air from the duct or passage 122 into the duct or passage 126 and the cylinder 110, above the plunger 138, which is caused to move downward to its intial position. This delayed action allows for a cooling off period to the weld, while the movable tip 220 is still under pressure of the piston 74. With the downward movement of the plunger 138, the channel 140 therein is displaced from its previous alignment with the inlet port 116 and the outlet port 130, of the main port 128, and placed in alignment with the exhaust port 118, whereby the air in the cylinder 16, of the hand controller, is bled back through the conduit 56, the distributing head 136, and the conduit 134, to the main port 128 and from thence inwardly through the duct or passage 132 into the channel 140, from which it passes outwardly through the exhaust port 118 and the duct or passage 120 to atmosphere. Also, the air in the main cylinder 64 will exhaust through the distributing head 136, by way of the conduit 134, the main port 128, the duct or passage 132, the channel 140, and the exhaust port 118, causing the welding tips 216 and 220 to open. At this time, the piston 160, in cylinder 150, is being returned to its initial position by the action of the coiled spring 162, the air within the cylinder 150, below the piston 160, is delayed in exhausting outwardly through the passage 156 until the piston 168, in the cylinder 152 moves downwardly to its initial position, at which position, the air in the cylinder 152 exhausts through port 172, needle valve 174, through flexible connection 222, cross duct 96, axial duct 90, cross duct 92, into annular channel 94, thence into cylinder 64 and to atmosphere through port 104. When the piston 160 is at its lowermost position within the cylinder 150, it will have moved the upper pair of adjustable lock nuts 148 against the upper end of the piston valve 142, returning the latter to its initial or lower position within the cylinder 114. The delay in the opening of the welding tips 216 and 220, besides allowing for the cooling down of the completed weld, also allows for the moving of the apparatus or tool to another job. However, if the trigger 46 is held depressed, the welding unit or tool will keep repeating the welding operations.

Having thus fully described my invention, it is to be understood that any and all changes in minor details of construction and arrangement of parts may be resorted to, provided that they fall within the scope of the appended claims.

What I claim is:

1. A pneumatic piston and cylinder assembly comprising two piston and cylinder units and means for pre-determined differential actuation of the pistons of the same by a continuous application of compressed air, the assembly comprising a main piston and cylinder unit, a control unit connected therewith and with a source of compressed air for applying the air to said main unit to actuate the piston thereof, a secondary piston and cylinder unit, means transmitting compressed air from the main unit into the secondary unit subsequent to initial actuation of the piston of the main unit, a principal piston in said secondary unit, means for actuating the same by said transmitted compressed air, an auxiliary piston associated with said principal piston, means releasably connecting said principal and auxiliary pistons for simultaneous initial actuation of the latter by the former, means interrupting said releasable connection after pre-determined actuation of the auxiliary piston, means restoring the auxiliary piston to its initial position upon interruption of said connection, means diverting the compressed air from said principal piston upon pre-determined additional actuation of the latter subsequent to said interrupted connection, with the auxiliary piston, and means operative upon said diversion of air pressure for restoring the main and the principal piston to initial position.

2. A pneumatic piston and cylinder assembly comprising two piston and cylinder units and means for pre-determined differential actuation of the pistons of the same by a continuous application of compressed air, the assembly comprising a main piston and cylinder unit, a control unit connected therewith and with a source of compressed air for applying the air to said main unit to actuate the piston thereof, a secondary piston and cylinder unit, means transmitting compressed air from the main unit into the secondary unit subsequent to initial actuation of the piston of the main unit, a principal piston in said secondary unit, means for actuating the same by said transmitted compressed air, an auxiliary piston associated with said principal piston, means releasably connecting said principal and auxiliary pistons for simultaneous initial actuation of the latter by the former, means interrupting said releasable connection after pre-determined actuation of the auxiliary piston, means restoring the auxiliary piston to its initial position upon interruption of said connection, means diverting the compressed air from said principal piston upon pre-determined additional actuation of the latter subsequent to said interrupted connection, with the auxiliary piston, and means operative upon said diversion of air pressure for restoring the main and the principal piston to initial position, for re-instituting the cycle of action during the continued application of compressed air.

3. A pneumatic piston and cylinder assembly comprising two piston and cylinder units and means for differential actuation of the pistons of the same by a continuous application of compressed air, the assembly comprising a main piston and cylinder unit, means for actuating the piston thereof by compressed air, a secondary piston and cylinder unit comprising a principal and an auxiliary piston, means for transmitting compressed air from the main unit into the secondary unit subsequent to actuation of the piston of the main unit for actuating said principal piston, means for actuating the auxiliary piston by said movement of the principal piston, means for terminating actuation of the auxiliary piston during continued movement of the principal piston and for restoring the auxiliary piston to initial position, means diverting the compressed air from said principal piston to terminate said actuation thereof after an interval of said continued movement, and means operative upon said diversion of air pressure for restoring the main and the principal piston to initial position.

4. A pneumatic piston and cylinder assembly comprising a main piston and cylinder unit, a secondary piston and cylinder unit associated therewith, pneumatic pressure means for actuating in succession the pistons of said main and secondary units, an auxiliary piston associated with the said secondary unit piston, means effecting actuation of the auxiliary piston upon actuation of the secondary unit piston, means limiting movement of the auxiliary piston and providing for a continued movement of the secondary unit piston, and means operative at a predetermined interval of said continued movement for releasing the pneumatic pressure on said main and secondary unit pistons.

5. A pneumatic piston and cylinder assembly comprising a main piston and cylinder unit, a secondary piston and cylinder unit associated therewith, pneumatic pressure means for actuating in succession the pistons of said main and secondary units, an auxiliary piston associated with the said secondary unit piston, means effecting actuation of the auxiliary piston upon actuation of the secondary unit piston, means limiting movement of the auxiliary piston and providing for continued movement of the secondary unit piston, means restoring the auxiliary piston to initial position independently of said continued movement of the secondary unit piston, and means operative at a pre-determined interval of said continued movement for releasing the pneumatic pressure on said main and secondary unit pistons.

6. A pneumatic piston and cylinder assembly comprising a main piston and cylinder unit, a secondary piston and cylinder unit associated therewith, pneumatic pressure means for actuating in succession the pistons of said main and secondary units, an auxiliary piston associated with the said secondary unit piston, means effecting actuation of the auxiliary piston upon actuation of the secondary unit piston, means limiting movement of the auxiliary piston and providing for continued movement of the secondary unit piston, means restoring the auxiliary piston to initial position independently of said continued movement of the secondary unit piston, means operative at a pre-determined interval of said continued movement for releasing the pneumatic pressure on said main and secondary unit pistons, and means for restoring the said main and said secondary unit piston to initial position.

OSCAR DANIELS.

REFERENCES CITED

The following references are of record in the file of this patent:

UNITED STATES PATENTS

| Number | Name | Date |
| --- | --- | --- |
| 2,067,064 | Platz | Jan. 5, 1937 |
| 2,250,302 | Johnson | July 22, 1941 |
| 2,307,968 | Sonneborn | Jan. 12, 1943 |
| 2,337,022 | Beiderman | Dec. 21, 1943 |
| 2,372,850 | Platz | Apr. 3, 1945 |

FOREIGN PATENTS

| Number | Country | Date |
| --- | --- | --- |
| 492,921 | Great Britain | Sept. 29, 1938 |